Figure 1:
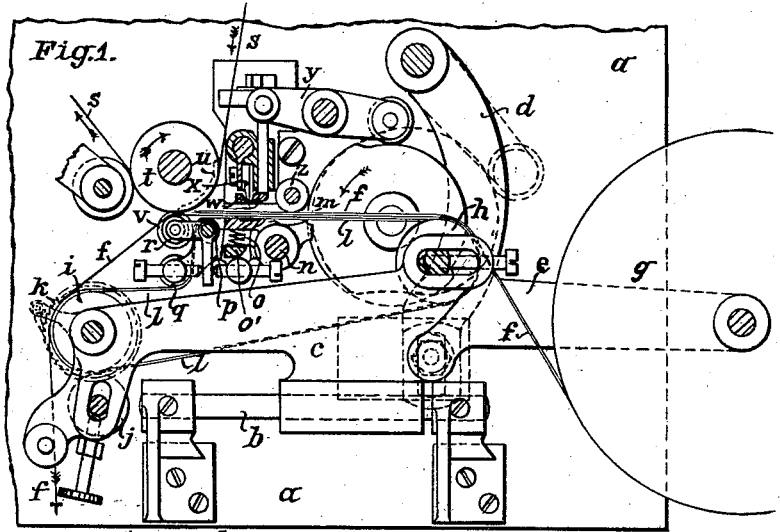

P. GOTTSCHALK.
APPARATUS FOR DELIVERING MATERIAL USED AS MOUTHPIECES IN THE MANUFACTURE OF CIGARETTES.
APPLICATION FILED MAR. 26, 1912.

1,095,850.

Patented May 5, 1914.

3 SHEETS—SHEET 1.

Witnesses:—
Hyperion Barry
F. George Barry

Inventor:—
Paul Gottschalk
by his attorneys
Brown & Seward

P. GOTTSCHALK.
APPARATUS FOR DELIVERING MATERIAL USED AS MOUTHPIECES IN THE MANUFACTURE OF CIGARETTES.
APPLICATION FILED MAR. 26, 1912.
1,095,850.
Patented May 5, 1914.
3 SHEETS—SHEET 2.
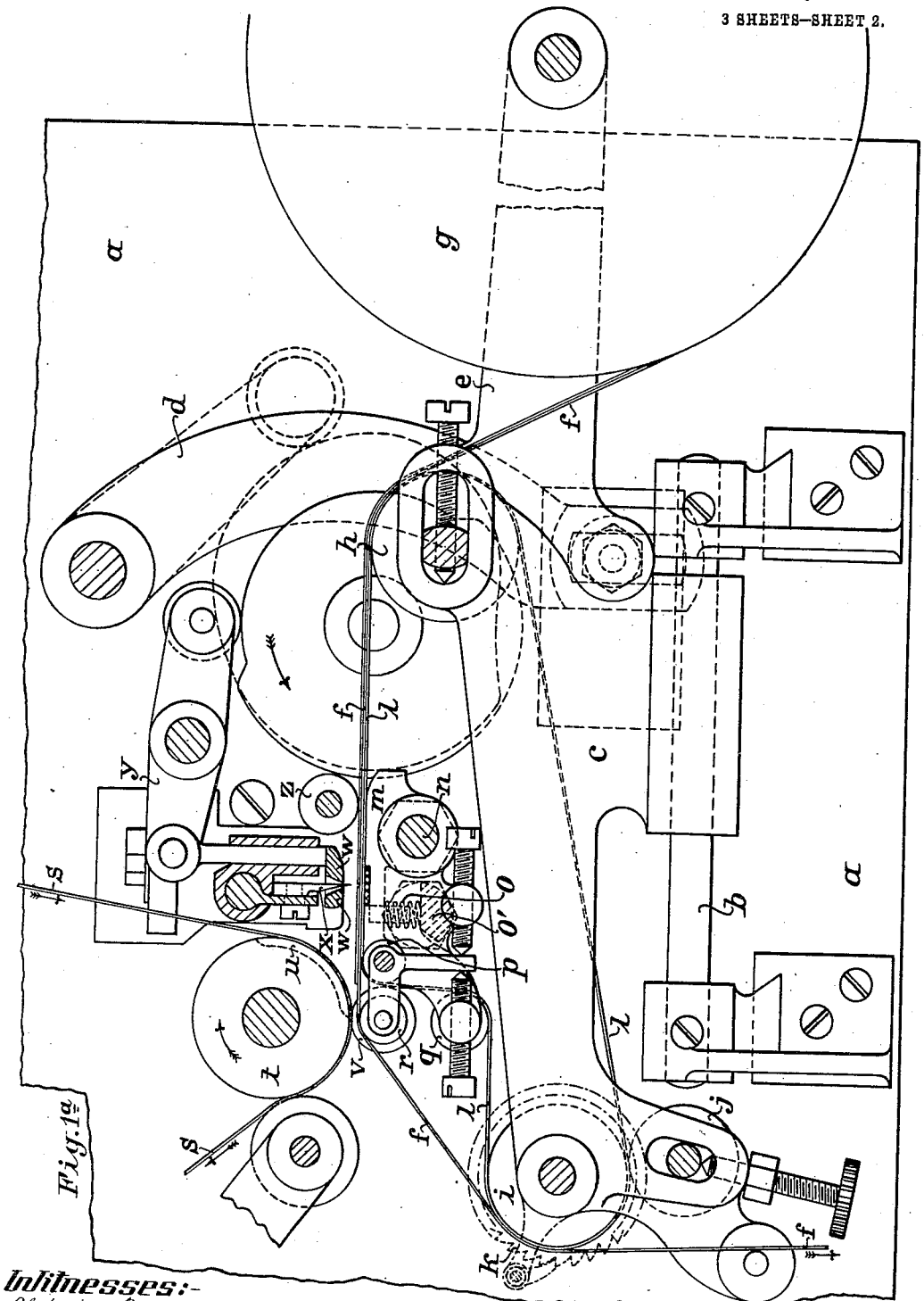
Fig. 1ª
Witnesses:—
Hyperion Barry
Ots W. Holmgren
Inventor:—
Paul Gottschalk
By Brown & Seward
his attorneys P. GOTTSCHALK.
APPARATUS FOR DELIVERING MATERIAL USED AS MOUTHPIECES IN THE MANUFACTURE OF CIGARETTES.
APPLICATION FILED MAR. 26, 1912.
1,095,850.
Patented May 5, 1914.
3 SHEETS—SHEET 3.
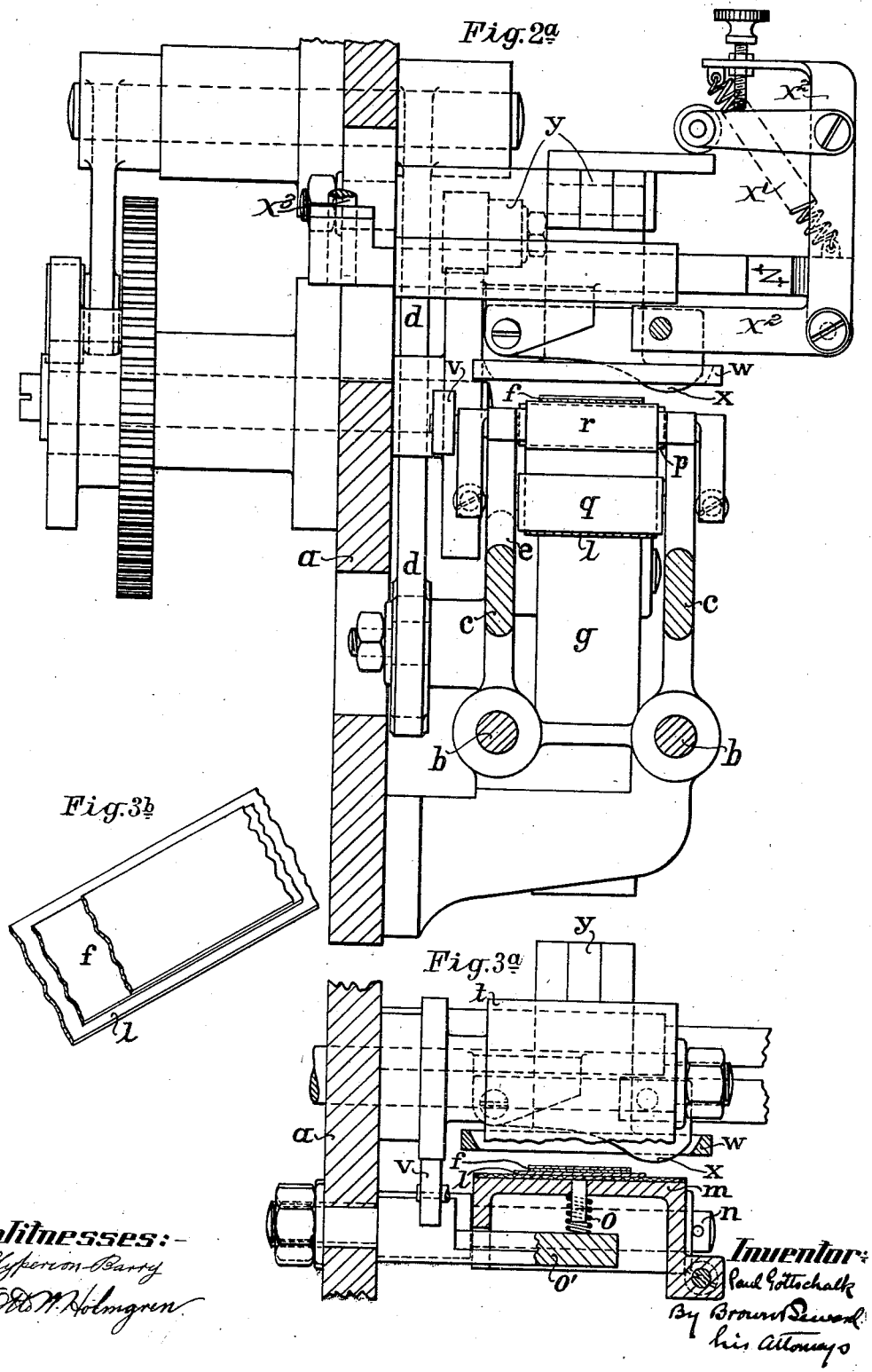

UNITED STATES PATENT OFFICE.

PAUL GOTTSCHALK, OF DRESDEN, GERMANY.

APPARATUS FOR DELIVERING MATERIAL USED AS MOUTHPIECES IN THE MANUFACTURE OF CIGARETTES.

1,095,850.  Specification of Letters Patent.  Patented May 5, 1914.

Application filed March 26, 1912. Serial No. 686,276.

*To all whom it may concern:*

Be it known that I, PAUL GOTTSCHALK, engineer, a subject of the King of Saxony, and resident of Dresden, Kingdom of Saxony, German Empire, have invented a new and useful Improvement in Apparatus for Delivering Material Used as Mouthpieces in the Manufacture of Cigarettes, of which the following is a specification.

The present invention has for its object certain improvements in apparatus or mechanism for delivering material, as for instance leaf-gold or the like, used for mouthpieces in the manufacture of cigarettes. In such an apparatus or mechanism the material used for mouth-pieces is supported by a temporarily moved strip or band, cut or severed on it and pasted or glued on a traveling strip of cigarette-paper.

The feature of the present invention consists in that the material used for mouthpieces together with its supporting strip or band and the roller delivering said material and supporting strip is moved toward the gluing or pasting point and the cutting or severing of a suitable length of leaf or layer as well as the feeding of corresponding lengths for the supporting strip and the leaf are effected during the backward movement or stroke of the delivery-apparatus and after the pasting or gluing has been done, said delivery-apparatus being arrested during the cutting and feeding operations mentioned. According to the present invention the supporting strip provided with leaf material is carried by an endless band guided around rollers supported in a sliding-carriage which is moved to and fro and receives the delivery-roller. Said endless band is passed also along a bridge tilting in an upward direction and between rollers arranged on said bridge. A holding and severing device of known construction and consisting of two clamping-jaws and a knife moved between them is arranged above the bridge mentioned in such a manner that the leaf-material together with its supporting strip and the endless band for the latter are held or clamped on the bridge during the backward movement of the sliding-carriage, the leaf-material is cut or severed and a corresponding length of supporting strip together with the leaf-material is drawn off the delivery-roller by the endless band moving in a backward direction.

The delivery-apparatus forming the object of the present invention has the great advantage that the procedures of holding, severing and delivering a corresponding length of leaf-material take place during the backward movement of the delivery-device and not during its forward movement, as usual in the known devices of similar kind, whereby a permanently uniform delivery is insured which does not act upon the material in an inconvenient manner.

This specification is an exact description of one example of my invention, while the claims define the actual scope thereof.

Reference is to be had to the accompanied drawing, forming a part of this specification, in which similar characters of reference indicate corresponding parts in both views.

Figure 2:
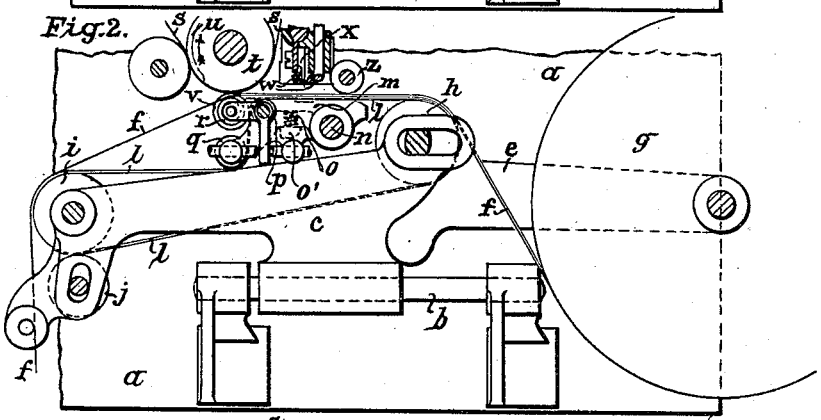
Figure 3:
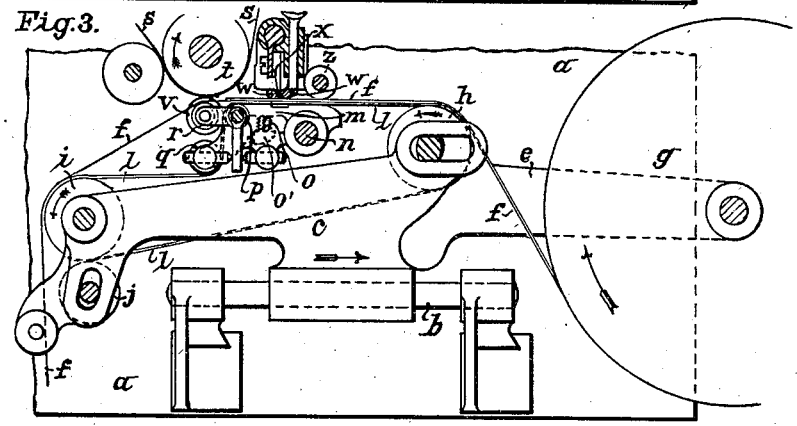

Figures 1, 2 and 3 represent in longitudinal elevation and partly in vertical sectional view an example of the construction of the object of invention in three different positions of operation. Fig. 1$^a$ is a view similar to Fig. 1, but on a larger scale. Fig. 2$^a$ is an enlarged view in detail of the carriage $c$, showing the arms $d$ $d$ as parts thereof. Fig. 3$^a$ is an enlarged view in detail of the bridge $m$, clamping jaws $w$ and knife $x$ with its operating lever $y$, and Fig. 3$^b$ is a detail perspective showing the application of the gold leaf to the strip.

In the drawing, $a$ is a plate fastened to a separate frame or to the cigarette-machine and $b$ are fixed rods on which the sliding-carriage $c$ may be moved to and fro by means of the lever $d$ (Fig. 1) actuated by a cam and a spring.

$g$ is the delivery-roller on which the supporting strip $f$ provided with the leaf-material, for instance leaf-gold, is wound, and which is carried on the sliding-carriage by the arm or lever $e$.

$h$, $i$ are two rollers supported by the sliding-carriage, the roller $h$ being adjustable, the roller $i$ being stationary. As seen in Fig. 1 in dotted lines, the shaft of the roller $i$, against which another roller $j$ may be adjusted, carries a ratchet wheel $k$ which allows a rotary movement of the roller $i$ in one direction only when the pawl of said ratchet wheel engages the latter.

$l$ is an endless band laid around the rollers $h$, $i$ and running from the roller $h$ over a hollowed bridge $m$.

$n$ is a pivot fastened to the plate $a$ and bearing the hollowed bridge by means of a spring $o$ resting on an arm $o^1$ projecting into said bridge in such a manner that the latter may be tilted in an upward direction. The forward end of the bridge mentioned carries two small rollers $p$, $q$ between which the upper part of the band traveling from the roller $h$ is passed after having crossed the bridge $m$ and connected with the part of the band running around the roller $i$ into the shape of the endless band $l$. Besides this, the forward end of the bridge is provided with an adjustable presser-roller $r$ over which the roller $t$ is pivoted rotating in the direction of the arrow, Fig. 1, and serving as a guide and a support for the cigarette-paper strip $s$ to be pasted with the mouth-piece leaf. The roller $t$ is provided with a lateral groove $u$ corresponding in length to the length of the mouth-piece leaf to be pasted or glued and entered by a disk $v$ on the upward tilting movement of the bridge caused by the spring $o$, said disk being laterally arranged on the roller $r$, in such a manner that the latter will press the supporting-strip $f$ supported by the endless band $l$ and guided around said roller $r$ together with the leaf-material resting on said supporting-strip against the paper-strip $s$. A holding and severing device of known construction, consisting of two clamping-jaws $w$ and a knife $x$ movably arranged between them is provided above the bridge $m$. The clamping-jaws $w$ are moved up and down by a lever $y$, Fig. 1, actuated by a cam and a spring and cause in their lowermost position the holding of the band $l$ and the supporting-strip $f$ covered with the leaf-material against the bridge $m$. During said holding action the knife $x$ is moved in a downward direction in the manner of a bent lever by means of a lever $x^2$ (Fig. 2$^a$) oscillated by a coiled spring $x^1$, in correspondence with the upward and downward movement of the lever $y$. The knife mentioned severs the leaf-material moved to and fro by a crank or similar motion connected at $x^3$, and the supporting strip provided for the feeding movement of the severed length of leaf material is in no way injured.

$z$ is a roller arranged behind the holding and severing device and assisting the guide and the feed of the traveling strip and band.

The mode of operation of the delivery-apparatus described above is as follows: In Fig. 1 the sliding-carriage $c$ is at the right-hand end of its stroke and the support-strip $f$ holds a severed piece of leaf-material ready to be delivered to the cigarette-paper $s$ pasted at the respective point of its length and moved along in the direction of the arrow, Fig. 1, and to be pressed against said cigarette-paper $s$ by means of the roller $r$, after the bridge $m$ has been tilted in an upward direction caused by entering the disk $v$ into the groove $u$ under a simultaneous yielding movement of the endless band $l$. During the forward stroke of the sliding carriage, the upper part or length of the endless band $l$ has been drawn in between the rollers $p$ and $q$, without causing any traveling movement in the manner shown in Fig. 2, said drawing in movement being produced by passing the endless band $l$ running around the rollers $h$, $i$, resting on the sliding carriage between the rollers $p$, $q$, arranged on the stationary bridge $m$ and by holding the roller $i$ by the ratchet wheel $k$. The delivery roller $g$ moved together with the sliding carriage in a forward direction has not been rotated, and hence the severed leaf-material has been fed to a point in which it is to be connected with the paper strip $s$ by pasting. When the sliding carriage $c$ has reached the end of its left hand stroke, Fig. 2, the leaf-material has been connected to the paper strip $s$ by pasting and the groove $u$ has left the disk $v$. In consequence of this, the roller $t$ has pressed down the bridge $m$ again into its position of rest so that the leaf-material lies freely on the roller $r$ and loosely hangs down from the roller $i$ or the part of the endless band placed on it. The sliding carriage together with all parts supported by it is then moved from the position shown in Fig. 2, to the right hand side in such a manner that the endless band $l$ is first drawn in between the stationary rollers $p$ and $q$, to the right hand side in such a length that the supporting strip $f$ together with its leaf-material is adjusted to the precise length of the said material to be severed. When the leaf-material, together with its supporting strip, has reached this position, the clamping jaws $w$ are moved down by the lever $y$, thereby causing a downward movement of the knife $x$ under the influence of the coiled spring $x^1$ and the lever $x^2$ (Fig. 2) in such a manner that the strip $f$ supporting the leaf-material and the endless band $l$ are held by the jaws $w$ provided on the bridge $m$. During this holding action, the sliding carriage $c$, shown in Fig. 3 in its middle position, is moved farther on to the right hand side and simultaneously the leaf-material supported by the strip $f$ is severed by the knife $x$, the to and fro movement of which is caused by a crank or similar motion. On the continued movement of the sliding carriage $c$ to the right hand side, the upper part of the endless band $l$ cannot be drawn off the bridge $m$, as it is held on the latter, but is drawn along between the rollers $q$ and $r$, its lower part only running from the roller $i$ to the roller $h$ to the right hand side up to a point in which the sliding carriage has reached again its final position. During the said drawing or backward movement of the endless band, the rollers $i$, $h$, will rotate or slip within the endless band in the direction of the arrow shown in Fig. 3. Therefore, the supporting strip *f* carrying the leaf-material will be kept at rest on the bridge *m*, together with the endless band, in such a manner that the delivery roller rotating in the direction of the arrow, Fig. 3, will feed the strip *f* supporting the leaf-material, a length necessary for the next operation of the sliding carriage. In consequence of this, the said sliding carriage provided with a severed length of leaf-material, will now be ready for another operation.

What I claim is:

1. In a delivery device for leaf material such as mouth-pieces in the manufacture of cigarettes, the combination with a sliding carriage movable to and fro and carrying the delivery roller and an endless band serving as a carrier for a strip supporting the leaf material, of an upwardly tilting bridge, of means for pressing, on upwardly tilting the bridge, the strip supporting the leaf material to the cigarette paper strip guided over a roller means for pasting the leaf material to the traveling cigarette paper strip and of means for moving away, on downwardly tilting the bridge, the strip supporting the leaf material from the cigarette paper strip after finishing the pasting and for holding the bridge in its resting position, substantially as and for the purpose specified.

2. In a delivery device for leaf material such as mouth-pieces in the manufacture of cigarettes, the combination with a sliding carriage movable to and fro, of a bridge tilted upward by means of a spring, of a disk *v* effecting the tilting of the bridge and of a roller *t* serving as a guide and a resistance for the cigarette paper strip to be pasted with the leaf material and having a groove *u* for the entrance of the disk *v* effecting the tilting motion of the bridge, substantially as described and for the purpose specified.

3. In a delivery device for leaf material such as mouth-pieces in the manufacture of cigarettes, the combination with a sliding carriage moved to and fro by means of a lever *d* and carrying the delivery roller and the endless band, of a bridge tilted upward by means of a spring, and of a holding and cutting device, consisting of two clamping jaws *w* moved up and down together by a lever *y* and of a knife *x* moved to and fro between said clamping jaws by means of a bar, substantially as described and for the purpose specified.

In testimony, that I claim the foregoing as my invention, I have signed my name in presence of two witnesses, this 13th day of March, 1912.

PAUL GOTTSCHALK.

Witnesses:
PAUL ARRAS,
CLARE SIMON.